United States Patent

Kearsey

Patent Number: 5,585,166
Date of Patent: Dec. 17, 1996

[54] FRICTION LINING

[75] Inventor: Andrew Kearsey, Schongau, Germany

[73] Assignee: Hoerbiger & Co., Schongau, Germany

[21] Appl. No.: 393,915

[22] Filed: Feb. 24, 1995

[30] Foreign Application Priority Data

Feb. 25, 1994 [AT] Austria ............................ 404/94

[51] Int. Cl.$^6$ ........................... B32B 5/16; F16D 69/00
[52] U.S. Cl. ............... 428/212; 188/106 R; 188/251 R; 188/251 A; 192/126; 428/219; 428/220; 428/297; 428/302; 428/317.9; 428/319.1; 428/319.3; 428/325; 428/326; 428/327; 428/328; 428/331; 428/334; 428/340; 428/341; 428/342; 428/354; 428/420; 428/507; 428/526
[58] Field of Search .................... 428/219, 212, 428/220, 297, 302, 310.5, 317.1, 317.5, 317.9, 319.1, 319.3, 323, 325, 326, 327, 328, 331, 334, 337, 340, 341, 342, 364, 420, 354, 502, 507, 526; 523/149, 153, 155, 156, 157; 188/381, 106 R, 251 R, 251 A; 192/30 R, 126

[56] References Cited

U.S. PATENT DOCUMENTS

| | | | |
|---|---|---|---|
| 4,197,223 | 4/1980 | Bartram | 523/156 |
| 4,348,490 | 9/1982 | Ogiwara | 523/156 |
| 4,373,038 | 2/1983 | Moraw et al. | 523/156 |
| 4,403,047 | 9/1983 | Albertson | 523/153 |
| 4,418,115 | 11/1983 | Le Lannou | 428/283 |
| 4,477,605 | 10/1984 | Okubo et al. | 523/155 |
| 4,656,203 | 4/1987 | Parker | 523/155 |
| 4,659,758 | 4/1987 | Landi et al. | 524/35 |
| 4,663,368 | 5/1987 | Harding et al. | 523/155 |
| 4,785,029 | 11/1988 | Honma et al. | 523/153 |
| 5,004,497 | 4/1991 | Shibata et al. | 75/229 |
| 5,041,471 | 8/1991 | Brinzey | 523/153 |
| 5,083,650 | 1/1992 | Seiz et al. | 192/107 M |
| 5,122,550 | 6/1992 | Schmitt | 523/149 |
| 5,217,778 | 6/1993 | LaCasse | 428/64 |
| 5,266,395 | 11/1993 | Yamashita et al. | 428/292 |

FOREIGN PATENT DOCUMENTS

| | | |
|---|---|---|
| 0162393 | 7/1989 | European Pat. Off. . |
| 2744944 | 4/1979 | Germany . |
| 3609879 | 10/1987 | Germany . |

Primary Examiner—Hoa T. Le
Attorney, Agent, or Firm—Watson Cole Stevens Davis, P.L.L.C.

[57] ABSTRACT

A friction lining (5) for a device which is cooled with fluid or lubricant and is intended for transferring torque, in particular a friction clutch, synchronizing element or brake, the friction lining being fastened on a carrier body (2) in order to form a friction surface (6) and the torque being transferred to a counter-surface, is constructed from at least two different layers, and in particular from at least one porous substrate (11, 11') which is fastened on the carrier body (2) and which is constructed like a composite material from a cellulose base with synthetic fibers and filler, and from a porous friction layer (12) which is fastened on the substrate (11,11') and is made of synthetic fibers, preferably carbon, which are bonded with a thermoset resin.

18 Claims, 2 Drawing Sheets

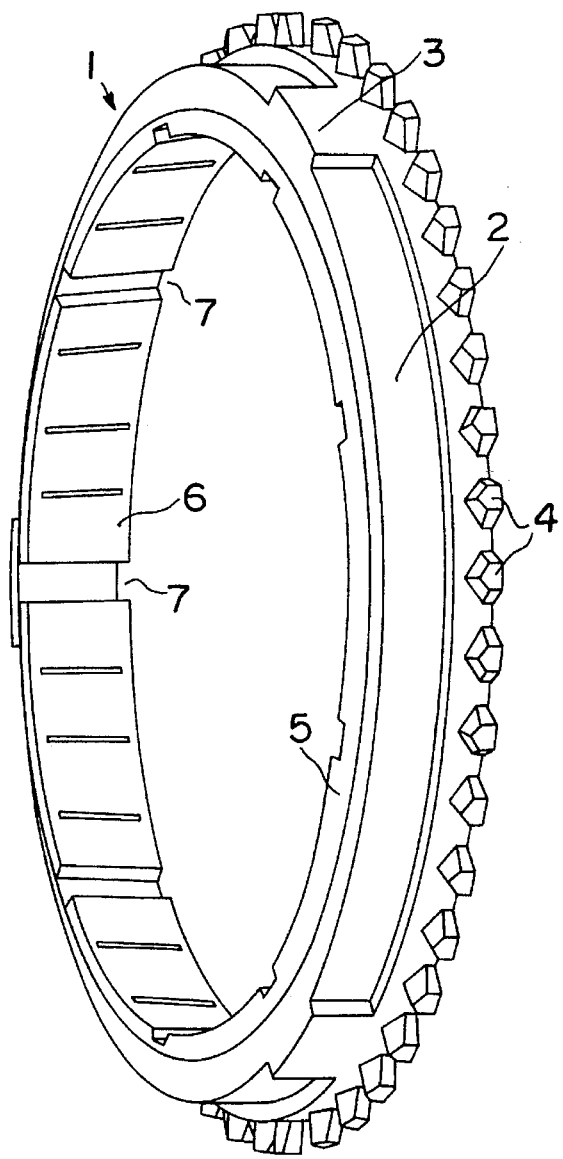
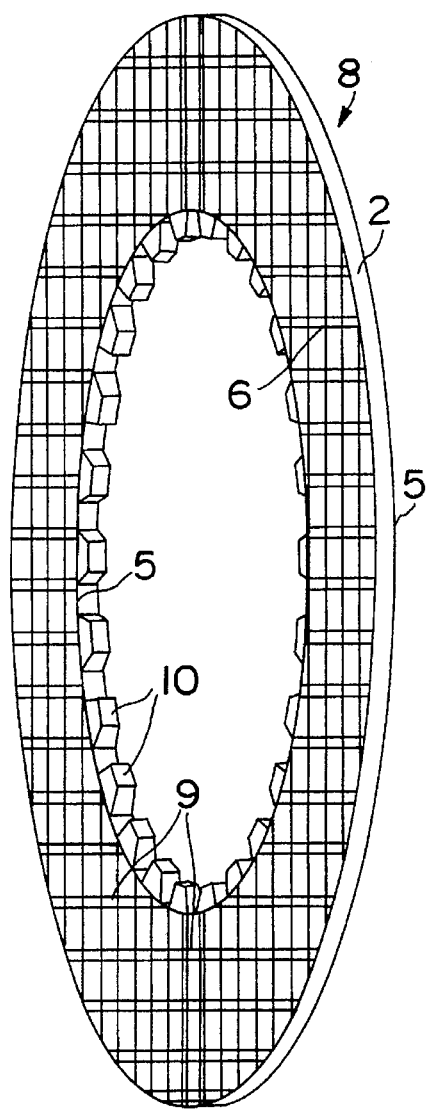
FIG.1
FIG.2

FRICTION LINING

BACKGROUND OF THE INVENTION

1. Field of the Invention

The invention relates to a friction lining which a device for transmits torque, in particular friction clutches, synchronizers or brakes, the friction lining being fastened on a carrier body in order to form a friction surface and the torque being transferred to a counter surface, whereby the friction lining is constructed from at least two different, porous layers, of which one is fastened on the carrier body. The porous substrate, made of a cellulose base with synthetic fibers and filler, exists as a support for the friction layer, which is also porous, fastened to the substrate and is made of fibers bonded with a thermoset resin.

2. The Prior Art

It is well-known to provide devices for transferring torque by means of friction between surfaces that are pressed against each other, such that at least one of these friction surfaces has a friction lining in order to increase the friction force between the two surfaces. In this regard, there are dry running and wet running friction pairings. The dry running friction pairings can be produced with relatively little complexity, but they are subject to a relatively high wear, so that they are used only when few demands are posed on the transfer of torque or the friction surfaces slide on each other for only a short period of time. In contrast, the wet running friction pairings are cooled with a fluid or lubricant, so that they exhibit higher resilience.

Such a wet running friction lining is known from DE-OS 27 44 944, which describes a synchronizing ring for synchronizing a gear in gear couplings, whose friction lining consists of friction material formed on an organic foundation, thus a so-called paper lining, which is bound together as the friction surface.

The paper lining is made of a material such as cellulose fibers, asbestos fibers, mineral and metal fibers and fillers, and is saturated with a synthetic resin.

Furthermore, it is known, especially for synchronizing devices for motor vehicle manual transmissions, to use sintered friction linings as well as friction linings made of different metals or metal alloys, in particular titanate-based and molybdenum-based friction linings, which are usually sprayed on the carrier surface of a synchronizer ring made of metal. However, friction linings of this kind are relatively expensive to manufacture and do not always exhibit satisfactory frictional properties.

EP 0 162 393 B1 describes a synchronizing ring whose carrier surface is provided with a separately pre-finished friction body, which is constructed from a carrier plate with a powder metal friction lining which is scattered on the carrier plate, subsequently sintered and then compacted. This separately manufactured friction body is finally affixed on the carrier surface of the synchronizer, e.g., by welding. When a suitable powder mixture is used to manufacture the sintered lining, this friction lining exhibits a high stability and also good frictional properties. However, the number of steps required for the production is relatively high because the separately finished synchronizer has to be first manufactured, subsequently finished and then bound to the friction surface.

Finally, another friction pairing for clutches or brakes is known from DE-OS 36 09 879, of whose friction surfaces at least one is composed of a friction lining produced by sintering. However, the friction lining is sintered directly on the friction surface of the carrier body, so that a separate production of the friction body and affixing on the carrier surface by means of its own carrier plate are dispensed with. As in the production of the flat friction discs, the scatter-sinter friction lining is fastened on an annular, flat carrier body, which then as a complete ring with one or more sintered friction surfaces is transformed into a cylinder or cone by deep drawing and finally calibrated and compacted. Thus, the manufacture of a friction ring with a scatter-sintered friction lining is significantly simplified. However, the advantages of a friction lining produced by sintering, especially the high stability to high loads, remain totally unaffected.

On the whole, the prior art wet running friction linings are made of a homogeneous friction material, which are affixed, e.g., bonded, welded, sprayed or sintered, directly on the carrier element. The result is automatically that the active components of the friction material have to be distributed homogeneously through the entire friction lining, in particular its entire thickness, in order to ensure that the components that develop the friction are present on the upper surface of the friction lining that transfers the torque to the counter-surface. However, in the case of a highly effective friction lining with high stability, the active components are expensive, e.g., carbon/carbon compound material or aramide fibers. Since a relatively large amount of this expensive friction material is necessary to manufacture such a friction lining, the lining is also relatively expensive. Friction linings produced on the basis of paper or cork are less expensive, but exhibit also lower performance. Friction linings made of sintered metal are also less expensive.

SUMMARY OF THE INVENTION

The invention has as its object improving a friction lining of the aforementioned design such that it combines the advantages of the synthetic fibers, viz. very high resistance to heat and low static-dynamic coefficient of friction ratio, with the advantages of the sintered metal lining, viz. reliability, low cost and negligible wear.

This object is achieved with the invention in that for a friction lining, cooled with a fluid or lubricant, a porous substrate exhibiting a weight ranging from 200 to 1500 g/m$^2$ and a friction layer, which is bound to the substrate, is made of synthetic fibers which are bonded with a thermoset resin and are, e.g., boron, carbon, aramide, which exhibits as many fibrils as possible, glass, stone or ceramic, preferably carbon, and that the friction layer exhibits a higher porosity than the substrate.

As demonstrated, wet running friction linings, such a paper linings, are virtually unworn during normal service. The lining merely sets, a feature that advances slowly during very long use. It is possible to produce wet running applications whose friction linings exhibits the same or longer lifespan than the vehicle. The result is that the components of the friction lining that affect the friction are necessary only in the friction lining's outermost layer, which rubs against the counter-surface. Under this actual friction lining surface a relatively inexpensive porous carrier material, whose task is only to support and cool the actual friction layer, viz. through absorption of the fluid or lubricant when there is no load on the friction lining, and to release the fluid or lubricant as soon as the friction lining is forced under pressure against the counter-surface.

Thus, the friction lining of the invention exhibits the advantageous properties of so-called synthetic linings, namely the very high resistance to heat at low static-dynamic coefficient of friction ratio, without exhibiting their drawbacks, namely the high cost of production, because in the design of the invention the relatively expensive components effecting the friction are provided in a thin layer on the surface of the friction lining, thus in only small amounts.

Tests under severe conditions with a friction lining which was provided with a four fiber thick (0.02 mm) friction layer were conducted on a test bench. The fibers were black and the substrate was white. Even though during the test a compression of 0.08 mm per lining took place, the fibers could still be seen under a microscope. At the conclusion of the test, the fibers were present in the same amount as before.

Other advantages of the friction lining of the invention are that its cost is comparable to that of the conventional homogenous paper lining with expensive ingredients such as synthetic fibers. In the friction lining of the invention the relatively expensive upper friction layer is very light and thin, only the inexpensive bottom substrate is relatively heavy and thick. Even the cost of production is not much higher than the cost for the production of the conventional paper linings. In addition, the friction lining of the invention can function on soft (unhardened) counter-surfaces, e.g., on surfaces made of steel, aluminum alloys and plastic.

Within the scope of the invention other designs of the friction lining of the invention are possible. Thus, the friction layer can exhibit a weight ranging from 10 to 120 g/m$^2$ and a thickness ranging from 0.02 to 0.3 mm. It has been demonstrated that these dimensions are suitable to obtain the advantages of the invention, in particular a thin friction layer, whose cost is, therefore, relatively low.

The substrate preferably contains a heat-resistant thermoset resin content ranging from 20 to 60% by wt. of its total weight, e.g., phenolic resins (resol or novolak), epoxy resin, melamine resin, silicone resin, acrylic resin, and modified resins based thereon, preferably phenolic resol resin in an amount ranging from 28 to 36% by wt. of the total weight of the substrate. The substrate designed in this manner is relatively simple to produce, relatively inexpensive and exhibits a porosity such that it can absorb fluid or lubricant for the cooling operation.

According to another feature of the invention, the friction layer can be made of synthetic fibers and thermoset resin, amounting to a least 70% by wt. of the total weight, and exhibit a percentage of heat-resistant thermoset resin, which ranges from 25 to 60% by wt. of the total weight of the friction layer, e.g., phenolic resins (resol or novolak), epoxy resin, melamine resin, silicone resin, acrylic resin, and the like, preferably phenolic resol resin, ranging from 45 to 55% by wt. of the total weight of the friction layer. According to the invention, the heat resistant thermoset resin of the friction layer can contain up to 50% by wt. of filler, preferably a filler made of carbon particles. Thus, a reliable bond between the components of the friction layer is obtained.

According to the invention, an advantageous friction layer results from the preferably non-woven synthetic fibers of the friction layer comprising 10 to 75% by wt. of the total weight of the friction layer and exhibiting a fiber length ranging from 3 to 25 mm, preferably from 6 to 15 mm, with a fiber diameter ranging from 3 to 50 μm, whereby preferably the amount of carbon fibers ranging from 50 to 60% by wt. of the total weight with a length ranging from 6 to 15 mm and a fiber diameter of 7 μm. The fibers are distributed and oriented nonuniformly over the entire thickness of the friction layer, thus resulting in especially good friction properties.

In another design of the invention the filler in the substrate has an absorbent structure, is made preferably of crystalline silicate and comprises 2 to 20% by wt. of the total weight of the substrate, preferably at least 10% by wt., whereby the filler can absorb more than 2.5 times its own weight in oil. The resulting large absorptive capacity guarantees that the friction lining will be cooled reliably even under high load.

Altogether the substrate of the invention has a porosity between 50 to 10%, preferably by volume between 20 and 10%, for synchronizing rings, and between 50 and 40% for friction disks.

Furthermore, it has also proven to be advantageous, if, according to the invention, the porosity of the friction layer is greater than the porosity of the substrate, whereby it ranges preferably from 50 to 95%. Since the heat generation is highest, as well-known, in the region of the friction layer, it is also advantageous to have adequate cooling in this region.

According to the invention it is expedient to make the lining thickness of the substrate between 0.3 and 2.5 mm while the thickness of the friction layer ranging from 0.02 to 0.3 remains the same independent from substrate thickness. This dimension has been relatively successful in practice.

The friction lining of the invention can be produced on a papermaking machines, where it is possible to produce the individual layers, thus the friction layer and the substrate, comprising one layer or several layers, either separately or to connect them together afterwards, or to create the individual layers jointly and to connect them together during their production, if the papermaking machine is set up for this kind of production.

To connect the individual layers of the lining, the invention provides that the friction layer and the substrate can be connected rigidly together by crosslinking the thermoset resin in both layers and/or by physically mixing the layers in the interface and/or bonding the layers. Which of these possibilities is to be used in practice depends on the existing circumstances, especially the available manufacturing machines and the exact composition of the individual friction layers. In any case, however, a reliable connection between the individual layers is obtained.

A preferred embodiment provides that the friction layer is bonded on the substrate with a layer of adhesive whose thickness ranges from 0.01 to 0.05 mm and is made of a highly heat resistant adhesive, e.g., nitrile-modified phenolic resin, epoxy resin, acrylic resin, and the like, preferably a nitrile-modified phenolic resin. Such a phenolic resin is commercially available under the tradename AL 6700 from the BF Goodrich company. As aforementioned, a rigid and durable connection is obtained by this method.

The friction lining of the invention is connected to the carrier body, e.g., made of metal or plastic, expediently in the same manner as the individual layers of the frictional lining are connected, whereby the same adhesive agent can also be used.

Other details and advantages of the invention follow from the following description of the embodiments, shown in the drawings.

BRIEF DESCRIPTION OF THE DRAWINGS

FIG. 1 is a perspective drawing of a synchronizing ring provided with a friction lining of the invention.

FIG. 2 is also a perspective drawing of a flat clutch disk with a friction lining of the invention on its two disks.

DETAILED DESCRIPTION OF THE PREFERRED EMBODIMENTS

Figure 3:
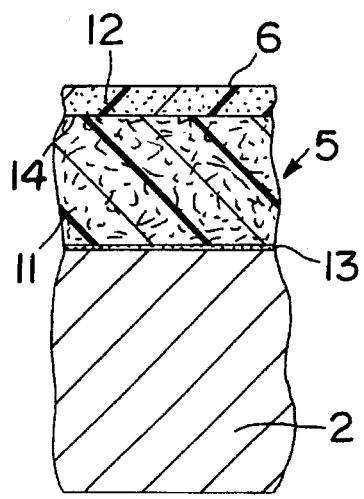
FIGS. 3 to 6 depict enlarged details of different designs of a cross section of a friction lining, which is fastened on a carrier body, according to the invention.

The synchronizing ring shown in FIG. 1 is denoted as 1 and comprises a carrier body 2 made of a mechanically rigid material, preferably a metal, a metal alloy or a sintered body, but it can also be made of plastic. The carrier body 2 is profiled in accordance with the respective application. In the embodiment the carrier body 2 exhibits cams 3 and outer teeth 4 over its outer circumferences.

The inner circumferences of the carrier body 2 is designed as a conical surface on which a friction lining 5 is fastened whose inner circumference also forms a conical friction surface 6, which is provided with grooves 7, extending at right angles over the friction surface 6, for the cooling fluid or the lubricant to drain off. The torque is transferred via the friction surface 6 to a counter surface of another synchronizing element (not illustrated).

The embodiment according to FIG. 2 is a flat clutch disk 8, which comprises a flat carrier body 2, each of its two sides being provided with one friction lining 5. The outside of each friction lining forms a flat friction surface 6, which is provided with a crossway grooving 9 for the coolant to drain. The inner edge of the clutch disk 8 has gear teeth 10 in order to pass on the torque transferred by the clutch. In this embodiment, too, the carrier body 2, which is designed as an annular disk, is made of metal or plastic. The friction surfaces 6 interact with flat counter surfaces, which are usually formed by flat annular metal disks with outer teeth in order to pass on the torque.

Figure 4:
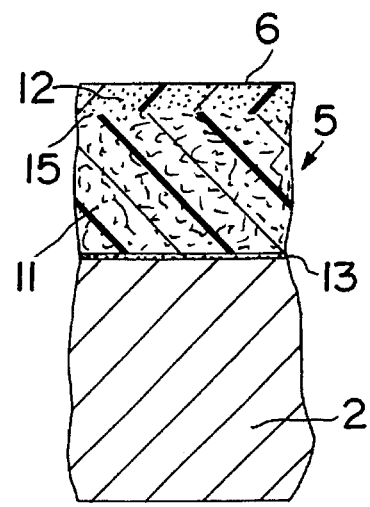
Figure 5:
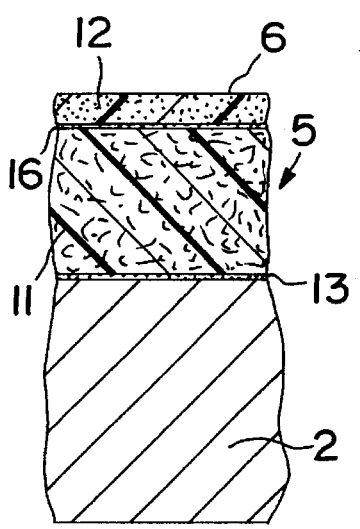

The construction of the friction lining according to the invention is evident from the embodiments depicted in FIGS. 3 to 6. In all of the embodiments the friction lining 5 comprises at least two layers and is fastened, e.g., bonded, on a carrier body 2. FIGS. 3 to 5 depict embodiments in which the friction lining 5 consists of two layers, and in particular a porous substrate 11, fastened on the carrier body 2, and a friction layer 12, which is also porous and is fastened on the substrate 11. The outside of the friction layer 12 forms a flat, cylindrical or conical friction surface 6, which interacts with a counter surface.

Figure 6:
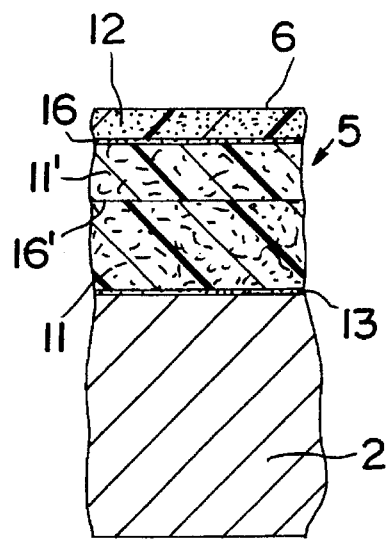

The major distinction between the embodiment according to FIG. 6 and that according to FIGS. 3 to 5 is that the friction lining 5 consists of three layers, and in particular a first substrate 11, a second substrate 11' fastened on the first, and finally the friction layer 12 with the friction surface 6, which is carried by the substrate 11'.

In all of the embodiments of the substrate 11, fastened on the carrier body 2, comprises a thermoset resin-bound cellulose-based composite material with synthetic fibers and filler. For example, it is a fiber-reinforced, filled plastic. The basis is cellulose fibers with additional synthetic fibers, which increase the heat resistance and the stability. Fillers, like crystalline silicates, which exhibit high oil absorptivity up to 250% of its own weight, are another important component.

Usually the substrate is made of material weighing from 300 to 1,000 g/m$^2$, whereby the weight depends on the final thickness of the lining. The resin content ranges from 20 to 50% by wt. of the total weight of the substrate and is mixed or combined with the other components expediently during the production of the paper or impregnated during a second process. The porosity of the substrate ranges usually from 10 to 50%. The lining thickness of the substrate 11 ranges from 0.3 to 2.5 mm.

The friction layer 12 is also porous and is made of synthetic fibers which are bonded with a thermoset resin and are preferably carbon. The friction layer exhibits a weight ranging from 10 to 60 g/m$^2$ and a thickness from 0.02 to 0.3 mm. The porosity of the friction layer 12 is greater than the porosity of the substrate 11 and ranges preferably from 50 to 95%.

How the friction layer 12 is fastened on the substrate 11 is of special importance. It can be done in different ways.

As a non-woven material, the friction layer 12 can be bonded on the substrate 11. In so doing, the amount of adhesive must be optimized in such a manner that the porosity between and within the substrate 11 and the friction layer 12 is not destroyed. However, the friction layer 12 can also be compressed and dried during the paper drying operation, e.g., as a non-woven material in the size press, with adhesive or resin as the binder. Then, while forming the paper of the substrate, the friction layer can be formed on an inclined wire of the papermaking machine and connected directly on the surface of the substrate. The non-woven material forming the friction layer can be laid directly on the wire under the paper forming the substrate, whereby then the friction layer serves as the carrier of the substrate.

FIGS. 3 to 6 illustrate different embodiments for connecting the individual layers of the friction lining. In all of the embodiments the friction lining 5 is fastened on the carrier body 2 with the aid of an adhesive layer 13. The friction layer 12 is fastened on the substrate 11 according to FIG. 3 through crosslinkage 14 of the thermoset resin in the two layers (chemical bonding), thus producing a rigid connection which does not disturb the porosity between the two layers 11, 12.

In contrast, the embodiment according to FIG. 4 provides a physical connection 15 (intertwining of fibers). The two layers 11 and 12 are mixed together there in the interface, a feature that also results in a rigid and yet porous connection. Finally, FIG. 5 shows a connection wherein the friction layer 12 is connected bonding 16 to the substrate 11. The embodiment according to FIG. 6 provides two bonding operations, and in particular a bond 16 between the friction layer 12 and the layer of the substrate 11' underneath the friction layer and bonding 16' between the two substrates 11 and 11'. These two bonds are also designed in such a manner that they do not have a negative impact on the porosity between the individual layers of the friction lining 5.

In the following two other examples of the composition of the friction lining according to the invention are cited that have been successful in tests.

EXAMPLE 1

The friction lining 5 is constructed from two different layers, and in particular a substrate 11 and a friction layer 12. The friction layer is made of 20 g/m$^2$ of a non-woven carbon fiber material, which has a fiber length ranging from 3 to 12 mm. Each fiber has about 12,000 filaments with a diameter of 7 μm each. The non-woven carbon fiber was saturated with 48% by wt. of the total weight of the friction layer with phenolic resol resin and bonded on a substrate weighing 400 g/m$^2$ with 30 g/m$^2$ of an adhesive AL 6700 from the BL Goodrich Company, where the adhesive was a nitrile-modified phenolic resin. The substrate comprises 40% by wt. of the total weight of the substrate made of cotton linters or cotton fibers, 15% by wt. of crystalline silicate, 15% by wt. of mineral fibers and 30% by wt. of phenolic resol resin. The non-woven carbon fiber material was made as an independent non-woven material with polyvinyl alcohol as the binder and subsequently impregnated with phenol resin.

The two parts, i.e., the carbon fiber friction lining 5 and substrate 11, were bonded together during the production of the disks or the layers and compressed and bonded on the carrier body 2 with the same type of adhesive that was used between the layers. This friction lining, which has a porosity of 45%, was tested and showed the results and advantages for disc application, as described below.

EXAMPLE 2

The friction lining 5 of the invention was produced simultaneously on a papermaking machine. The friction layer 12 comprises a 35 g/m² non-woven carbon fiber material, whose fiber length ranges from 6 to 15 mm. Each fiber has about 9,000 filaments and each filament has a diameter of 30 μm.

The non-woven carbon fiber friction layer was produced on an inclined wire with 48% by wt. of the total weight of the friction layer of phenolic resol resin and 10% by wt. of aramid fiber and then immediately applied on the substrate prior to the dandy roll. The substrate has a weight of 500 g/m² and comprises 40% by wt. of cotton linters, 20% by wt. of crystalline silicate, 15% by wt. of mineral fibers and 25% by wt. of phenol resol resin.

The friction lining thus produced can be processed as a normal paper lining, e.g., cut into segments, which can be used for synchronizing rings, or cut into disks, which can be bonded on the steel core. If this friction lining is bonded and used on a synchronizing ring with a porosity of 25%, it shows especially good results.

Under the conditions prevailing during the synchronization of gear boxes of motor vehicles, the friction lining of the invention shows the following properties.

The dynamic coefficient of friction was $\mu=0.12$ and the static coefficient of friction was $\mu=0.125$ μm. The result of this low coefficient of friction ratio is a comfortable gear change. In synchronizing devices with prior art paper linings the static coefficient of friction is much higher, a feature that results is a significantly less desirable operating feel; and for sintered linings the dynamic coefficient of friction is less, whereby also less power can be transmitted.

With a 30% change in density, there is only a 5% change in the coefficient of friction. This is much less than for other friction linings, where, for example, a 10% change in density results in a 10% change in the coefficient of friction.

The carbon fibers used in the friction lining according to the invention are not oil-sensitive. When different kinds of oil were used, the change in the coefficient of friction was only about 10%. In comparison, there was a 30% change in the coefficient of friction for sintered metal.

The carbon fibers of the friction lining according to the invention have a very open, porous structure, which enables the use of the friction lining without grooving.

Clutch tests with the friction lining according to the invention yielded the following advantages.

Both the dynamic and the static coefficient of friction was $\mu=0.08$ for the paper lining according to the invention whereas the two coefficients of friction for a comparable sintered lining are about $\mu=0.05$ dynamically and $\mu=0.08$.

The resilience was higher than for normal paper linings; in particular the friction linings of the invention do not burn or char.

A higher energy capacity than in sintered metal and pure synthetic fiber linings is reached. In addition, the linings according to the invention have a very high heat resistance and thermal capacity.

The friction lining of the invention generates on the counter surface, interacting with the friction lining, so-called "hotspots," thus overheated spots, only under very high energy and power conditions, whereby the necessary conditions are much higher than for paper and pure carbon fiber linings.

I claim:

1. A fluid-cooled friction lining for attachment to a carrier body in a torque-transferring device, the friction lining including a friction surface facing away from the carrier body, the friction lining comprising a porous substrate layer which can be bonded to the carrier body and which includes a mixture of cellulose and synthetic fibers, filler and a thermoset resin, and a porous friction layer which provides said friction surface and which includes a mixture of non-woven synthetic fibers in a thermoset resin, said substrate layer having a weight from 200 to 1500 g/m² and said friction layer having a higher porosity than said substrate layer.

2. A friction lining as claimed in claim 1, wherein said synthetic fibers in said friction layer are selected from the group consisting of boron, carbon, aramide, glass, stone and ceramic.

3. A friction lining as claimed in claim 1, wherein the friction layer has a weight ranging from 10 to 120 g/m² and a thickness ranging from 0.02 to 0.3 mm.

4. A friction lining as claimed in claim 1, wherein the substrate layer includes said thermoset resin in an amount ranging from 20 to 60% by weight of the total weight of the substrate layer.

5. A friction lining as claimed in claim 4, wherein said thermoset resin is selected from the group consisting of phenolic resin, epoxy resin, melamine resin, silicone resin and acrylic resin.

6. A friction lining as claimed in claim 1, wherein the friction layer includes at least 70% by weight of synthetic fibers and thermoset resin, and said thermoset resin is present in an amount of from 25 to 60% by wt. of the total weight of the friction layer.

7. A friction lining as claimed in claim 6, wherein said thermoset resin is selected from the group consisting of phenolic resin, epoxy resin, melamine resin, silicone resin and acrylic resin.

8. A friction lining as claimed in claim 6, wherein said thermoset resin of the friction layer contains up to 50% by wt. of filler.

9. A friction lining as claimed in claim 1, wherein the non-woven synthetic fibers of the friction layer have a fiber length ranging from 3 to 25 mm and a fiber diameter ranging from 3 to 50 μm.

10. A friction lining as claimed in claim 9, wherein said synthetic fibers comprise carbon fibers having a fiber length of 6 to 15 mm and a fiber diameter of about 7 μm.

11. A friction lining as claimed in claim 1, wherein the filler in the substrate layer has an absorbent structure, is made of crystalline silicate and comprises 2 to 20% by wt. of the total weight of the substrate layer, the filler being capable of absorbing more than 2.5 times its own weight in oil.

12. A friction lining as claimed in claim 1, wherein the substrate layer has a porosity between 50 and 10% by volume.

13. A friction lining as claimed in claim 1, wherein the porosity of the friction layer ranges from 50 to 95% by volume.

14. A friction lining as claimed in claim 1, wherein a thickness of the substrate layer ranges from 0.3 to 2.5 mm while a thickness of the friction layer ranges from 0.02 to 0.3 mm.

15. A friction lining as claimed in claim 1, wherein the friction layer and the substrate layer are connected together by at least one of crosslinking the thermoset resin in both layers, physically mixing the layers at an interface, and bonding the layers.

16. A friction lining as claimed in claim 1, wherein the friction layer is bonded on the substrate layer with a layer of adhesive whose thickness ranges from 0.01 to 0.05 mm and is made of a heat resistant adhesive.

17. A friction lining as claimed in claim 16, wherein said adhesive is selected from the group consisting of nitrile-modified phenolic resins, epoxy resin and acrylic resin.

18. A friction lining as claimed in claim 1, including a porous intermediate layer between said substrate layer and said friction layer.

* * * * *